United States Patent [19]
Tsamas

[11] Patent Number: 4,891,961
[45] Date of Patent: Jan. 9, 1990

[54] KEY RING

[76] Inventor: Anton Tsamas, 408 Kaplan Ave., Hackensack, N.J. 07601

[21] Appl. No.: 242,941

[22] Filed: Sep. 9, 1988

[51] Int. Cl.⁴ ............................................. A44B 15/00
[52] U.S. Cl. .................................. 70/456 R; 24/236; 70/457
[58] Field of Search ...................... 70/456 R, 457, 458, 70/459, 460; 24/3 K, 236, 237; D3/61, 103

[56] References Cited

U.S. PATENT DOCUMENTS

| | | | |
|---|---|---|---|
| 149,751 | 4/1874 | Hall | 24/237 |
| D. 285,989 | 10/1986 | MacDonald | D3/61 |
| 354,157 | 12/1886 | Macmillan | 70/458 |
| 380,124 | 3/1888 | Letchworth | 24/236 |
| 479,538 | 7/1892 | Townsend | 24/237 X |
| 591,038 | 10/1897 | Goodwin | 24/236 |
| 603,247 | 5/1898 | Becker | 24/237 |
| 641,316 | 1/1900 | Meyer | 24/236 |
| 659,890 | 10/1900 | Howitt | 24/237 |
| 785,399 | 3/1905 | Brandt | 70/457 X |
| 827,187 | 7/1906 | Smith | 70/458 |
| 861,797 | 7/1907 | Bieber | 24/236 |
| 1,110,873 | 9/1914 | Boye | 24/237 X |
| 1,162,955 | 12/1915 | Vaughan | 70/457 |
| 1,183,812 | 5/1916 | Gillespie | 70/457 |
| 1,343,495 | 6/1920 | Davis . | |
| 1,388,100 | 8/1921 | Davis . | |
| 3,545,049 | 12/1970 | Brueggeman | 24/236 |
| 3,657,909 | 4/1972 | Boswell . | |
| 4,176,534 | 12/1979 | Denney | 70/459 X |

FOREIGN PATENT DOCUMENTS 1481078  4/1967  France ................................. 70/458

Primary Examiner—Lloyd A. Gall
Attorney, Agent, or Firm—Blum Kaplan

[57] ABSTRACT

A key ring being less susceptible to deformation and accidental opening is provided. The key ring includes a base having a slot therein to define a plate between a first resilient shoulder and a second resilient shoulder. Each shoulder is torsionally displaceable with respect to the base. A first arm extends from the first resilient shoulder while a second arm extends from the second resilient shoulder. The arms overlap to form a loop.

11 Claims, 2 Drawing Sheets

KEY RING

BACKGROUND OF THE INVENTION

This invention relates to a key ring, and in particular, to a key ring which is deformed to enable keys to be mounted thereon or removed therefrom.

Key rings such as the ones illustrated in U.S. Pat. Nos. 1,343,495 and 1,388,100 are known in the art. These key rings include a main ring and a second auxiliary loop forming a supplemental key holder. Such key rings are usually formed of a wire which is flattened and looped to be brought into opposed facing relationship to form the supplemental ring, as a split ring. The supplemental ring is in a plane perpendicular to the main ring so that by pressing against the sides of the main ring, the supplemental ring may be opened allowing freedom to remove or insert the key.

A disadvantage of such prior art key rings is that the ring will open from pressure placed on the outside of the ring. Accordingly, the ring will accidentally open when inadvertent pressure is placed at the sides when the ring is grasped in the pocket or purse of the user.

Another type of key ring known in the art is depicted in U.S. Pat. No. 3,657,909 and includes a singular deformable resilient wire formed in two loops having a substantially figure eight construction. The ends of the wire member overlap to form the top loop. The loops are adapted to be separated by torsional deformation of the entire wire. By pressing together separated cross portions of the wire joining the loops, the torsional deformation of the wire causes separation of the overlapped wire ends. When the cross portions of the wire are released, the resiliency of the wire causes the overlapped end portions to again engage each other to close the loop.

The disadvantage of this second type of conventional key rings is that they lack structural integrity. The wire key ring by its physical nature is subject to considerable deformation and hence, accidental opening. Accordingly, a key ring which is not easily deformed and hence is less likely to be accidentally opened is desired.

SUMMARY OF THE INVENTION

Generally speaking, in accordance with the instant invention, a key ring having increased structural integrity as well as an attractive ornamental design is provided. The key ring includes a body. An arm extends from each side of the body and is bent to overlap the other arm to form a key engaging loop. Each arm lies in substantially the same plane as the body. Slots are provided in the body between the positions where the arms extend from the body to form two torsional shoulders which extend into each of the overlapping arms allowing the formation of two leaf springs integrally formed with each half of the upper portion loop.

In an exemplary embodiment the slots in the lower portion forming the arms also form a plate within the body on which a logo or other such design may be applied. Buttons extending from each shoulder are formed above and below the plane of the key ring in facing relationship so that depression of the buttons provides a simple opening of the key ring.

Accordingly, it is an object of the instant invention to provide an improved key ring.

Another object of the instant invention is to provide a key ring which is less susceptible to deformation over time.

A further object of the instant invention is to provide a key ring which is less likely to be accidentally opened.

Still other objects and advantages of the invention will in part be obvious and will be apparent from the specification.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a better understanding of the invention, reference is had to the following description taken in connection with the accompanying drawings, in which.

DETAILED DESCRIPTION OF THE PREFERRED EMBODIMENTS

Figure 1:
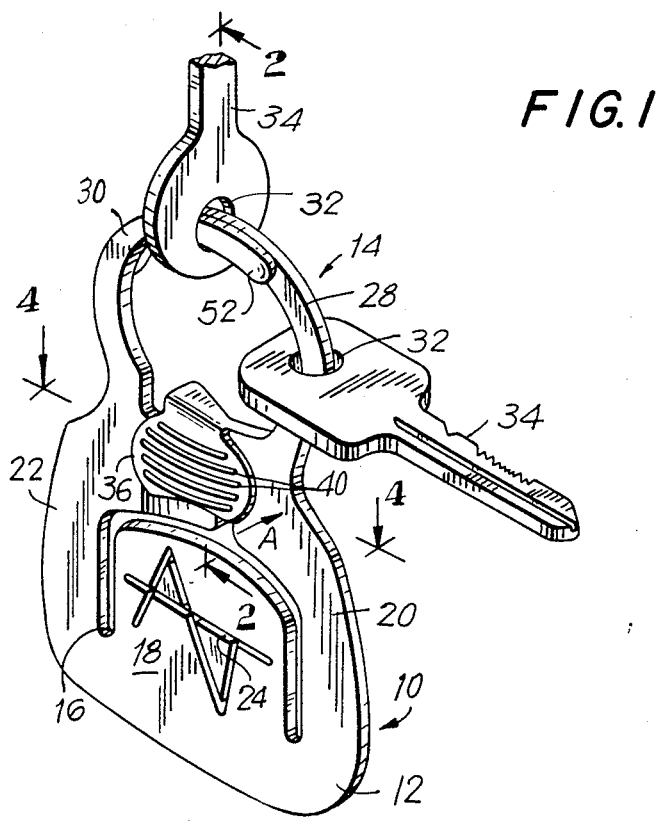
FIG. 1 is a perspective view of the key ring constructed in accordance with the invention.
Figure 2:
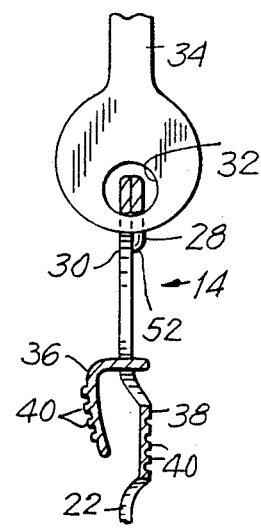
FIG. 2 is a sectional view taken along line 2—2 of FIG. 1.

Reference is first made to FIGS. 1-4, wherein a key ring, generally indicated as 10, and constructed in accordance with a preferred embodiment of the instant invention is depicted. Key ring 10 includes a base 12 and a key engaging section, generally indicated as 14, integrally formed with base 12. Key engaging section 14 lies in the same plane as base 12.

Base 12 is formed with a slot 16 therein. Slot 16 extends in a substantially n shaped manner from one side of base 12 to the opposite side of base 12 to form a plate 18, a first resilient spring 20 and a second resilient spring 22 which act as resilient shoulders at either side of base 12. Slot 16 allows for torsional movement of springs 20, 22 relative to base 12. The greater the length in which groove 16 extends towards the bottom of base 12, the more flexible springs 20 and 22 become. A gap 26 exists between spring 22 and spring 20 allowing them to be deformed independently of each other.

Figure 3:
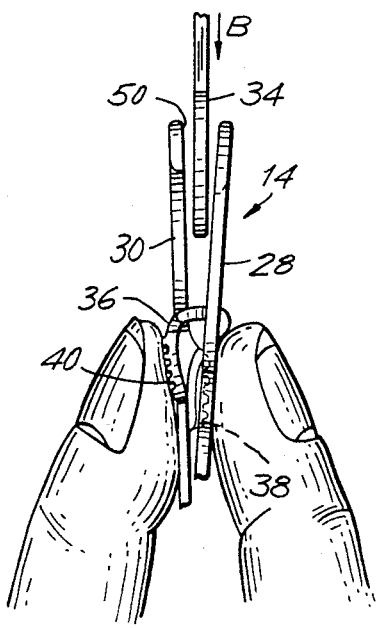
FIG. 3 is a partial side elevational view of the key ring securing a key in accordance with the instant invention.
Figure 4:
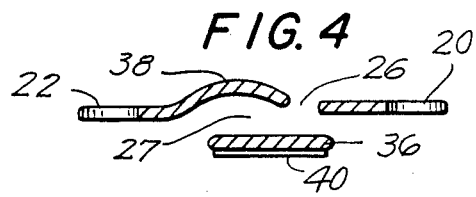
FIG. 4 is a sectional view along line 4—4 of FIG. 1.

Key engaging section 14 includes a first arm 28 integrally formed with leaf spring 20 and a second arm 30 integrally formed with leaf spring 22. Arm 28 overlaps arm 30 to form a closed loop. Each arm 28 and 30 have free ends 52, which free ends have an outer peripheral surface which lie along the outer periphery of the loop. Each arm 28, 30 is preferably sized to fit within an opening 32 of a key 34. The loop formed by key engaging portion 14 may be opened by deforming leaf spring 20 relative to leaf spring 22, causing arm 28 to separate from arm 30. (FIG. 3)

Leaf spring 20 is deformed relative to leaf spring 22 by providing a force in a direction of arrow A in a direction perpendicular to the plane of base 12 and key engagement section 14. To facilitate the applying of pressure in the direction of arrow A, a first button 36 is integrally formed with leaf spring 20 and a second button 38 is integrally formed with leaf spring 22. Button 36 and button 38 are disposed in substantially facing relationship across a gap 27. Buttons 36, 38 are formed with ridges 40 to provide a more secure grip when pressing buttons 36, 38.

A symbol 24 may be engraved on plate 18 to provide a distinct decorative look to key ring 12. Additionally, photographs or other such decorations may be affixed at plate 18.

Figure 5:
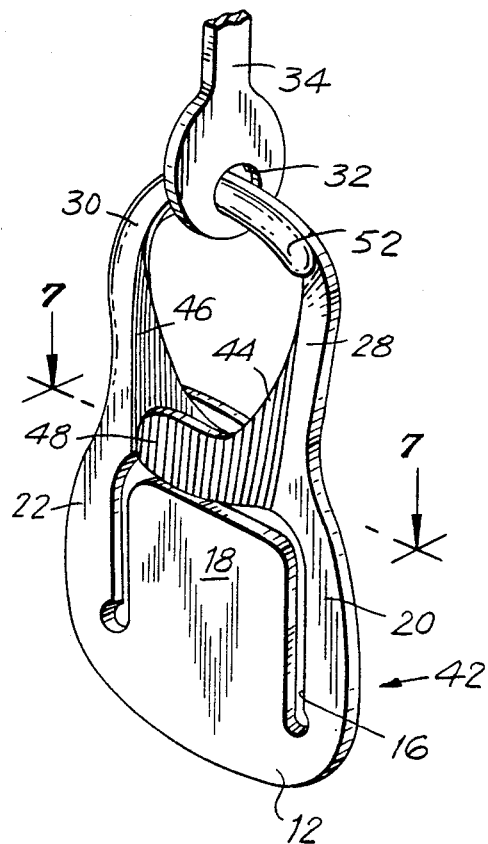
FIG. 5 is a perspective view of a second embodiment of the key ring co in accordance with the invention.
Figure 6:
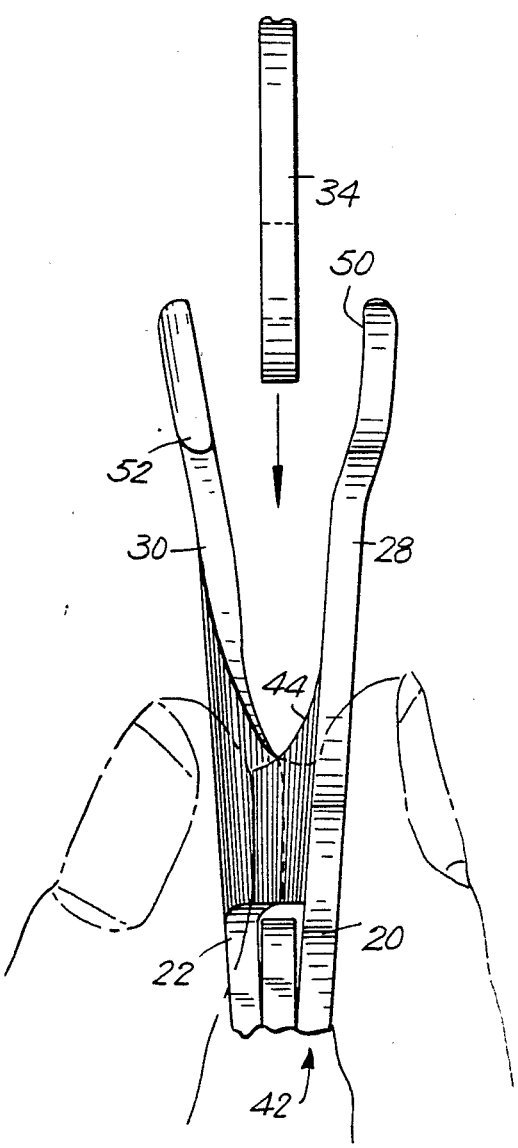
FIG. 6 is a partial side elevational view of the key ring of FIG. 5.
Figure 7:
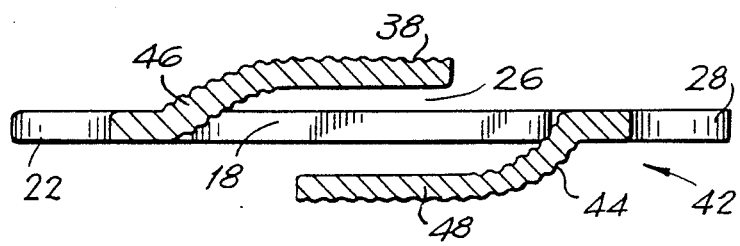
FIG. 7 is a sectional view taken along line 7—7 of FIG. 5.

Reference is now made to FIGS. 5–7 in which a key ring generally indicated as 42, constructed in accordance with a second embodiment of the invention is provided. Key ring 42 is similar to key ring 10 and like reference numerals are utilized to denote like elements discussed above. The primary difference between key ring 42 and key ring 10 is the formation of the buttons and the addition of curved side reinforcement sections.

A base 12 contains a slot 16 forming a plate 18 and leaf springs 20, 22. Arms 28, 30 are integrally formed with leaf springs 20, 22 respectively and overlap to form a loop.

Over time arms 28, 30 may tend to bend in a direction away from the plane of base 12 relative to leaf spring 20, 22. A side reinforcement section 44 extending from leaf spring 20 to arm 28 and a side support portion 46 extending from leaf spring 22 to arm 30 provide greater stability and structural integrity preventing the bending of arms 28, 30 relative to leaf spring 20, 22 over time. Each reinforcement section 44, 46 is formed as a curved region extending above the plane formed by base 12 and engagement portion 14.

A button 48 extends directly from leaf spring 20 substantially parallel to button 38 and is disposed opposite button 38 across a gap 26.

Both key rings 12 and 42 are formed as a unitary piece. The key ring may be formed of a rigid metal or plastic material which allows deformation of the leaf springs relative to each other.

Reference is now made FIGS. 1 and 3 in which the operation of key ring 12 is provided. Pressure is applied by the fingers of the users against buttons 36, 38 causing leaf springs 20, 22 to deform relative to base 12 and in opposite directions to each other. This causes arms 28, 30 to separate providing an opening 50. Key 34 is inserted within opening 50 in the direction of arrow B so that hole 32 is positioned within gap 50. Key 34 is then twisted so that a free end 52 of arm 30 is inserted within hole 32. Key 34 is then slid along arm 30 towards leaf spring 22 until key 34 has cleared arm 28. Pressure is then released from buttons 36, 38 closing the loop of key engaging portion 14 securing the keys within key engagement portion 14. To remove key 34 the process is merely reversed.

By providing a key ring having a single body having a slot formed within the key ring base to form a leaf spring at either end of the base and having arms integrally formed with the respective leaf spring, the arms overlapping at the top an improved key ring is provided. The key ring is less susceptible to inadvertent opening or deformation over time due to pressure applied along the plane of the key ring. Additionally, a new aesthetic appeal is inherently provided by an ornament plate formed within the groove.

It will thus be seen that the objects set forth above, among those made apparent in the preceding description, are efficiently attained and, since certain changes may be made in the above construction without departing from the spirit and the scope of the invention. It is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter language might be said to fall therebetween.

What is claimed is:

1. A key ring comprising: a base, a slot formed in the base to define a plate and a first resilient shoulder integrally formed with said base, a second resilient shoulder integrally formed with said base, said shoulders being torsionally displaceable with respect to the base, a first arm extending from said first resilient shoulder and a second arm extending from said second resilient shoulder, said first arm and said second arm overlapping to form a loop, said first and second arms each having a free end, each said free end having an outer periphery that define the periphery of the loop when the loop is in a closed position, so that a positive pressure can be applied to said resilient shoulders to cause said second arm to be displaced apart from said first arm at the overlapping portion to permit a key to be removed from the loop.

2. The key ring of claim 1, wherein the first arm is integrally formed with said first shoulder and said second arm is integrally formed with said second shoulder.

3. The key ring of claim 1, wherein the key ring is formed as a unitary piece.

4. The key ring of claim 1, wherein the slot is substantially n-shaped.

5. The key ring of claim 1, further comprising a support region extending from said first shoulder to said first arm and a second support region extending from said second shoulder to said second arm, each respective support region being formed as a curved portion, said curved portion extending either above or below the plane of the base.

6. The key ring of claim 5, further comprising a first button integrally formed with said first shoulder and a second button integrally formed with said second shoulder, whereby pressure applied at each button causes said first shoulder and said second shoulder to move relative to each other in opposite directions.

7. The key ring of claim 6, further comprising ridges formed along said first button and said second button.

8. The key ring of claim 1, further comprising a first button integrally formed with said first shoulder and a second button integrally formed with said second shoulder, whereby pressure applied at each button causes said first shoulder and said second shoulder to move relative to each other in opposite directions.

9. The key ring of claim 8, further comprising ridges formed along said first button and said second button.

10. A key ring comprising a base, a slot formed in the base having a substantially n-shape to define a plate and a first resilient shoulder integrally formed with said base, a second resilient shoulder integrally formed with said base, said shoulders being torsionally displaceable with respect to the base, a first arm integrally formed with said first resilient shoulder extending from said first resilient shoulder and a second arm integrally formed with said second resilient shoulder extending from said second resilient shoulder, said first arm and said second arm overlapping to form a loop, said first and second arms each having a free end, each said free end having an outer periphery that define the periphery of the loop when the loop is in a closed position, so that a positive pressure can be applied to said resilient shoulders to cause said second arm to be displaced apart from said first arm at the overlapping portion to permit a key to be removed from the loop.

11. The key ring of claim 10, further comprising a first button integrally formed with said first shoulder and a second button integrally formed with said second shoulder, whereby pressure applied at each button causes said first shoulder and said second shoulder to move relative to each other in opposite directions.

* * * * *